United States Patent [19]

Nagano

[11] Patent Number: 4,852,698
[45] Date of Patent: Aug. 1, 1989

[54] SIDE-PULL TYPE CALIPER BRAKE

[75] Inventor: Masashi Nagano, Izumi, Japan

[73] Assignee: Shimano Industrial Company Limited, Osaka, Japan

[21] Appl. No.: 276,387

[22] Filed: Nov. 25, 1988

[30] Foreign Application Priority Data

Nov. 27, 1987 [JP] Japan .......................... 62-181241[U]
Nov. 27, 1987 [JP] Japan .......................... 62-181242[U]
Nov. 27, 1987 [JP] Japan .......................... 62-181243[U]

[51] Int. Cl.$^4$ ............................................. B62L 1/16
[52] U.S. Cl. ............................. 188/24.19; 188/196 M
[58] Field of Search ............... 188/24.19, 24.22, 71.7, 188/196 M, 196 V

[56] References Cited

U.S. PATENT DOCUMENTS 4,482,033 11/1984 Yoshigai .......................... 188/24.19

Primary Examiner—Duane A. Reger
Attorney, Agent, or Firm—Stevens, Davis, Miller & Mosher

[57] ABSTRACT

A side-pull type caliper brake comprising a pair of brake arms having brake shoes respectively, a fixing member having a pivot shaft and a support arm extending from one radial side of the pivot shaft, and a return spring, so that one of the brake arms is pivoted to the pivot shaft, the other is pivoted to the support arm, and an association mechanism having an adjusting screw bolt is provided between the brake arms, wherein the pivot position for the brake arm at the support arm is displaced toward the brake shoe with respect to a horizontal line passing the axis of the pivot shaft, a straight line connecting the axis of the pivot shaft and the pivot position of the brake arm at the support arm, is inclined with respect to the horizontal line, the adjusting screw bolt is disposed perpendicularly with respect to the inclining horizontal line, and the rotary operating portion at the adjusting screw bolt is outwardly inclined with respect to the utmost end of the screw bolt, thereby facilitating operation of the adjusting screw bolt.

5 Claims, 4 Drawing Sheets

SIDE-PULL TYPE CALIPER BRAKE

FIELD OF THE INVENTION

The present invention relates to a side-pull type caliper brake provided with; a pair of brake arms having brake shoes and operating portions; a fixing member having a pivot shaft and a support arm disposed at one radial side of the pivot shaft and extending reversely with respect to the position where the operating portions are disposed, one of the brake arms being pivoted to the pivot shaft and the other to the support arm; and an association mechanism having an adjusting screw bolt and disposed between both the brake arms.

BACKGROUND OF THE INVNENTION

Generally, this kind of side-pull type caliper brake, as disclosed in the Japanese Utility Model Laid-Open Gazette No. Sho 60-192,992 and as shown in FIG. 5, is provided with; a pair of brake arms D and E having brake shoes A and operating portions B and C respectively; a fixing member I having a pivot shaft F and a support arm H disposed at one radial side of the pivot shaft F and extending reversely to the operating portions B and C, one of the brake arms D and E being pivoted to the pivot shaft F and the other to the support arm H; and an association mechanism K having an adjusting screw bolt J and disposed between the brake arms D and E.

In the conventional side-pull type caliper brake, as shown in FIG. 5, a line 1 connecting the pivot point $0_1$ for one brake arm D pivoted to the pivot shaft F and that $0_2$ for the other brake arm pivoted to the support arm H is horizontal, and the axis m of adjusting screw bolt J at the association mechanism K is positioned at the lengthwise center of and perpendicularly to the line 1 so as to apply equivalent operating forces to the brake arms D and E.

In a case where the side-pull type caliper brake constructed as above-mentioned is mounted on a bicycle, especially on the front wheel side thereof, since bicycle equipments, such as, a reflector, a front basket and a head lamp, are mounted on the front wheel side, the adjusting screw bolt J is positioned in a relatively restricted space between the bicycle frame and the equipments mounted thereon, and a rotary operating portion j at the adjusting screw bolt J is disposed in the restricted space in a manner of orienting vertically upwardly. As a result, the adjusting screw bolt J, when operated to adjust the associaiton relation between both the brake arms D and E, must be rotated from just above, thereby creating the problem in that the adjusting screw bolt J is difficult to operate.

Also, at the aforesaid side-pull type caliper brake, return springs (not shown in FIG. 5) are interposed between the fixing member I and the respective brake arms D and E.

Therefore, when a control wire W fixed to the operating portion C is pulled for the braking action, a spring force of a return spring for biasing the brake arm D at the driven side is smaller, or reduced because of being rusted after the use or mudded, thereby creating the problem in that the respective arms are not associated in operation with each other and the brake arm at the driven side operates in advance of that at the driving side to cause the one-sided braking effect.

SUMMARY OF THE INVENTION

An object of the invention is to provide a side-pull type caliper brake which can operate from slantwise above an adjusting screw bolt at an association mechanism between a pair of brake arms.

Another object of the invention is to provide a side-pull type caliper brake, which is not problematical of strength of the return spring, can associate the driven side brake arm with the operation of the driving side brake arm even when the return spring is rusted or mudded, thereby eliminating the one-sided braking effect, and also, even when the return spring is broken, the brake shoe is prevented from being brought into press-contact with the wheel rim.

The side-pull type caliper brake of the invention is characterized by providing; a pair of brake arms having brake shoes and control poritons respectively; a fixing member having a pivot shaft and a support arm disposed at one radial side of the pivot shaft and extending reversely to the position where the operating portion for each brake arm is disposed; and a return spring; so that one of the brake arms is pivoted to the pivot shaft, the other is pivoted to the support arm, an association mechanism having an adjusting screw bolt having a rotary operating portion is disposed between the brake arms, the pivot position of the brake arm pivoted to the support arm is displaced toward the brake shoe with respect to a horizontal line passing the axis of the pivot shaft, a straight line connecting the pivot position and the axis of the pivot shaft is inclined with respect to the horizontal line, the adjusting screw bolt is disposed perpendicularly to the inclined straight line, and the rotary operating portion at the adjusting screw bolt is positioned apart from the pivot shaft with respect to the utmost end of the adjusting screw bolt.

The adjusting screw bolt thus is positioned apart at its rotary operating portion from the pivot shaft so that the rotary operation portion is disposed slantwise upwardly and its rotary operation is not hindered by the bicycle frame and various equipments thereon.

The side-pull type caliper brake of the invention is further characterized in that the return spring is interposed only between the fixing member and the brake arm at the driven side when the rotary operating portion is operate, so as to bias the driven side brake arm by the return spring in the direction of following the brake arm at the driving side.

Thus, no return spring is interposed between the brake arm to be the driving side and the fixing member, so that there is no need for the return spring interposed between the driven side brake arm and the fixing member to set strength of the return spring in consideration of the relation with a return spring to be provided at the driving side brake arm. Also, even when the return spring between the driven side brake arm and the fixing member is rusted or mudded to change its spring reaction, the driven side brake arm can always be associated with the driving side one, and even when the return spring for biasing the driven side brake arm is broken, the breake shoe at the driven brake arm can reliably be prevented from being brought into press-contact with a wheel rim.

The side-pull type caliper brake of the invention is still further characterized in that the fixing member is provided with a center indicator for indicating the center of a distance between the brake shoes.

Accordingly, when the caliper brake of the invention is equipped to the bicycle frame, the center indicator provided at the fixing member pivotally supporting the brake arms coincides with the reference portion for indicating the widthwise center of the bicycle, whereby the brake shoes can be mounted to the optimum position where the brake shoes are spaced always at equal intervals from the wheel rim, thereby causing no one-sided braking effect.

These and other objects of the invention will become more apparent in the detailed description in connection with the accompanying drawings.

DETAILED DESCRIPTION OF THE INVENTION

Figure 1:
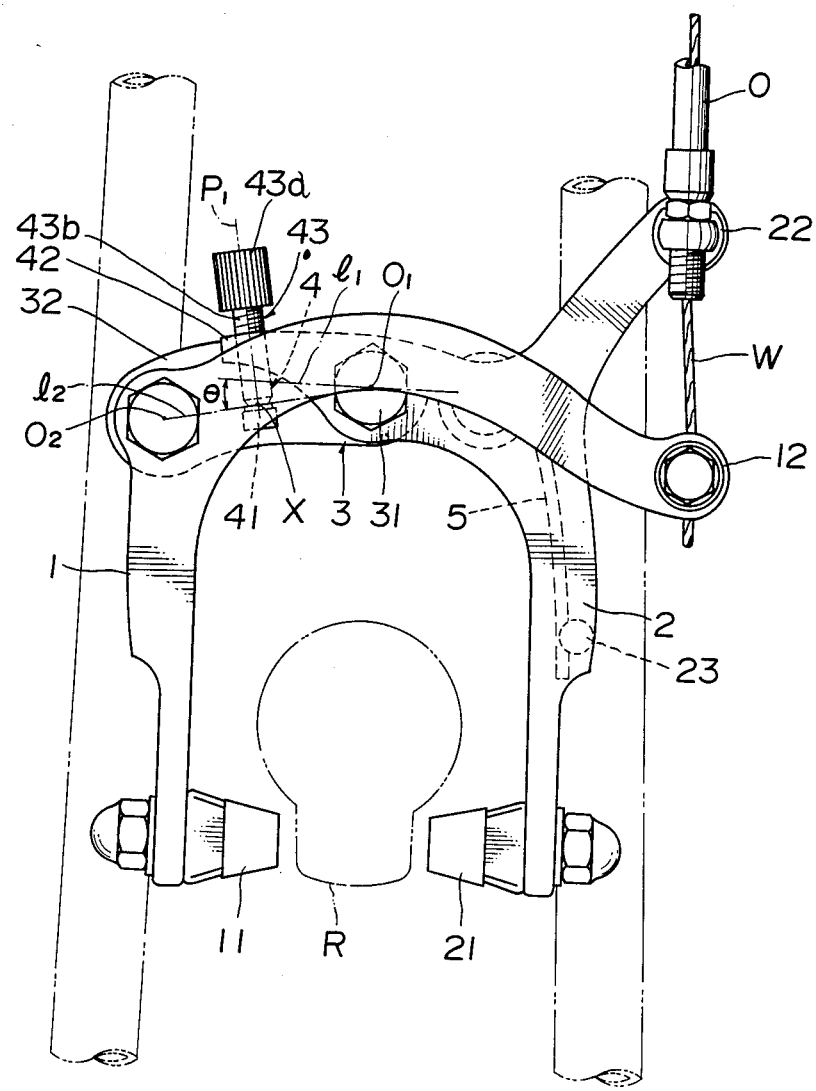
FIG. 1 is a front view of a first embodiment of a side-pull type caliper brake of the invention.
Figure 2:
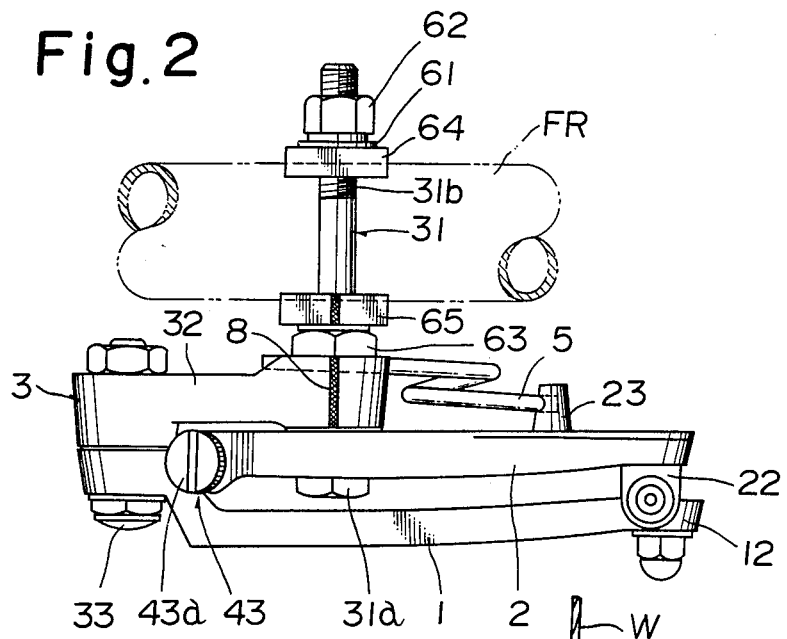
FIG. 2 is a plan view thereof.
Figure 3:
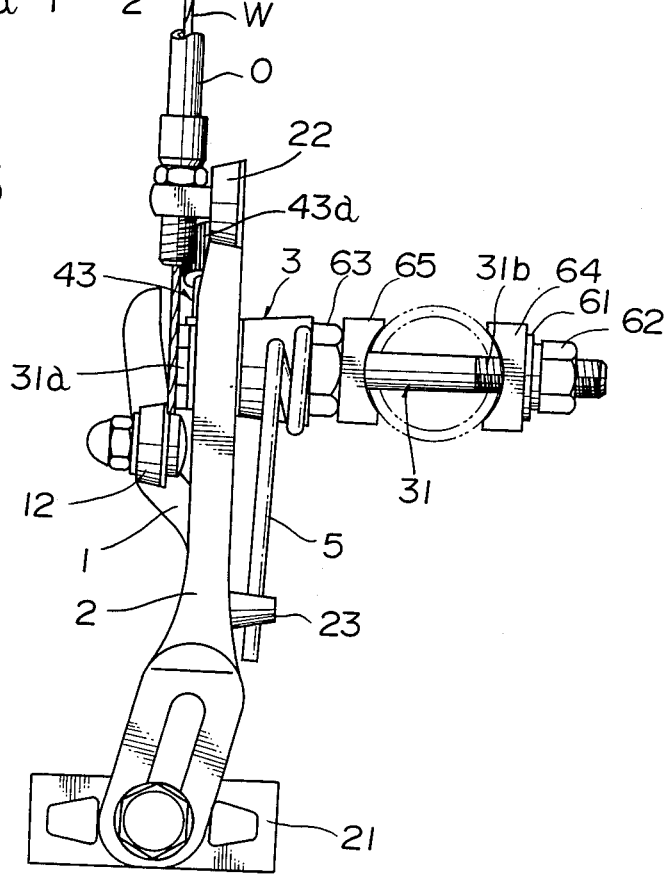
FIG. 3 is a right side view of the same.

Referring to FIGS. 1 through 3, reference numeral 1 designates a C-like shaped brake arm, 2 designates a Y-like-shaped brake arm. A brake shoe 11 is provided at the lower end of the brake arm 1 and an operating portion 12 for fixing one end of a control wire W is provided at the upper end of the same. A brake shoe 21 is provided at the lower end of the brake arm 2 and an operating portion 22 for supporting one end of an outer sheath 0 for guiding the control wire W is provided at the upper end of the brake arm 2, the operating portions 22 and 12 being vertically opposite to each other.

reference numeral 3 designates a fixing member having a pivot shaft 31 mounted on the bridge at the front fork or back fork of the bicycle frame FR and a support arm 32 disposed at one radial side of the pivot shaft 31, that is, at one axial side of the wheel of the bicycle, and extending reversely to the operating portions 12 and 22, the brake arm 1 is pivoted at an intermediate poriton thereof to the utmost end of support arm 32, and the brake arm 2 is pivoted at the other upper end to the pivot shaft 31, so that the control wire W is pulled to rotate the brak arm 1 counterclockwise in FIG. 1, and the brake arm 2 is rotated clockwise in FIG. 1.

The pivot shaft 31 is provided at the fore end thereof with a larger diameter rotary operating portion 31a and at an intermediate portion and the reverse end with a screw thread 31b. A washer 61 and a tightening nut 62 are provided at the screw thread 31b at the reverse end of pivot shaft 31, abutting members 64 and 65 each having an internally arcuate surface in contact with the outer periphery of the bridge at the bicycle frame FR and not-rotatable with respect thereto are attached to the opposite surfaces of the washer 61 and a lock nut 63 for fixing the fixing member 3 to the pivot shaft 31, thereby sandwiching the frame FR between the abutting members 64 and 65 so as not to rotate the fixing member 3 with respect to the frame FR.

Reference numeral 4 designates an association mechanism provided between the brake arms 1 and 2, so that when the control wire is pulled, operation of the brake arm 1 at the driving side (to be hereinafter called the driving side arm) is associated with that of the brake arm 2 at the driven side (to be hereinafter called the driven side arm). The association mechanism 4 comprises a transmission portion 41 provided between the pivot position and the operating portion of the braking arm 1 and an adjusting screw bolt 43 screwable with a driven arm 42 extending outwardly from the pivot position at the brake arm 2, the utmost end of the screw thread at the adjusting screw bolt 43 abutting against the transmission portion 41, thereby allowing the counterclockwise operation of the brake arm 1 in FIG. 1 to be associated with the brake arm 2 when the braking action is exerted.

In a first embodiment shown in FIGS. 1 through 3, the pivot position $0_2$ of the brake arm 1 at the support arm 32 is displaced toward the brake shoe 11 with respect to a horizontal line $l_1$ passing the axis $0_1$ of the pivot shaft 31, a straight line $l_2$ connecting the pivot position $0_2$ and the axis $0_1$ of the pivot shaft 31 is inclined at an angle of $\theta$ with respect to the horizontal line $l_1$, and the adjusting screw bolt 43 is disposed perpendicularly $P_1$ with respect to the line $l_2$ and screws with the driven arm 42, the adjusting screw bolt 43 being inclined at the rotary-operating portion 43a thereof always apart from the pivot shaft 31.

The adjusting screw bolt 43 is so disposed that the association point of the brake arms 1 and 2, that is, the point X at the utmost end of adjusting screw bolt 43 abutting against the transmission portion 41 is positioned at the lengthwise center of the line $l_2$.

At the first embodiment, a return spring 5 for biasing the driven side arm 2 in the direction of following the driving side arm 1 (counterclockwise in FIG. 1) is provided only between the driven side arm 2 and the fixing member 3 so that the utmost end of adjusting screw bolt 43 provided at the driven side arm 2 can always contact with the transmission portion 41 at the driving side arm 1.

The return spring 5 is formed of a wire rod coiled at an intermediate portion and fixed at one end to the support arm 32 and at the other end to a spring holder 23 provided at an intermediate portion between the pivot position at the driven side arm 2 and the brake shoe 21.

In the aforesaid construction of the caliper brake. when the control wire W is pulled for the braking action, the driving side arm 1 fixed to one end of the wire W moves counterclockwise in FIG. 1, the movement of driving side arm 1 is transmitted to the driven side arm 2 through the adjusting screw bolt 43 and driven arm 42, and the driven arm 2 moves clockwise in FIG. 1 in association with the driving side arm 1, so that the brake shoes 11 and 21 at the brake arms 1 and 2 are brought into press-contact simultaneously with the braking surface of wheel rim R for exerting the braking action.

The return spring 5 is not provided between the driving side arm 1 and the fixing member 3, but provided only between the driven side arm 2 and the fixing member 3, whereby the driven side arm 2 can always be associated with operation of the driving side arm 1 without being affected by strength of the return spring. Also, even when the return spring 5 is rusted or mudded to reduce the reaction of the return spring 5, the driven side arm 2 can be associated with operation of the driving side arm 1.

When the return spring 5 is broken, the brake arms 1 and 2 are not at all subjected to the reaction of return spring 5, thereby reliably preventing the brake shoes 11 and 21 from being brought into press-contact with the wheel rim R.

In the aforesaid construction, the adjusting screw bolt 43 at the association mechanism 4 is operated to adjust intervals between the brake shoes 11 and 21 and the wheel rim R. During the adjustment, the rotary control portion 43a at the adjusting screw bolt 43, which is inclined away from the pivot shaft 31 and oriented slantwise upwardly, is controllable from slantwise above without being hindered by the bicycle frame and equipments mounted thereto, thereby facilitating the operation of adjusting screw bolt 43.

Since the adjusting screw bolt 43 is so disposed that the association point X of the arms 1 and 2 is positioned at the center of the line $l_2$ connecting the axis $0_1$ of the pivot shaft 31 and the pivot position $0_2$ at the driving side arm 1, both the brake arms 1 and 2 can reliably be associated with each other.

Also, since the association point X for both the arms 1 and 2 is covered by the driving side arm 1, there is no fear that mud or obstraction enters into the association point X.

In the first embodiment, a reference portion 7 is provided at the upper surface of the abutting member 65 not-rotatable with respect to the frame FR and a center indicator 8 coincident with the reference portion 7 is provided at the upper surface of the root of support arm 32 at the fixing member 3.

Thus, the fixing member 3 is rotatably operated so that the center indicator 8 coincides with the reference portion 7, and then fixed together with the abutting member 65 to the frame FR, whereby the caliper brake can always be mounted to the optimum position with respect to the frame FR. Hence, intervals between the wheel rim R and the brake shoes 11 and 21 can be equal. Accordingly, when the braking action is exerted, both the brake shoes 11 and 21 are brought into contact with the wheel rim R by the equal braking forces, thereby eliminating the occurrence of one-sided braking effect.

Alternatively, the reference portion 7 may be provided at the bridge for fixing thereto the pivot shaft 31. Also, the reference portion 7 is not positively provided as in FIG. 2, but may utilize the existing configuration to be used as the reference portion. In this case, for example, the reference portion 7 is provided at the bridge, and the crest of the inner pleriphery of the through bore for inserting therein the pivot shaft 31 is used as the reference portion. Or, the crest of upwardly swollen portion at the lengthwise center of the bridge is used as the reference portion.

Figure 4:
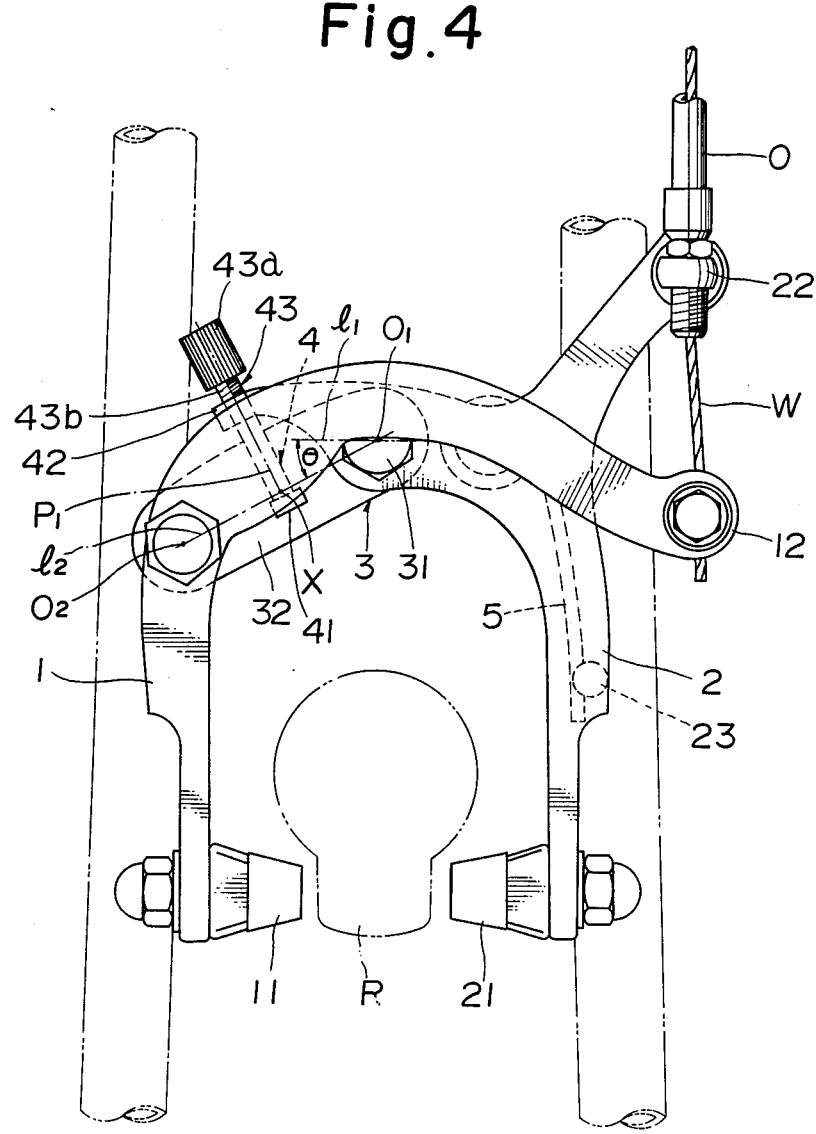
FIG. 4 is a front view of a second embodiment of the invention.
Figure 5:
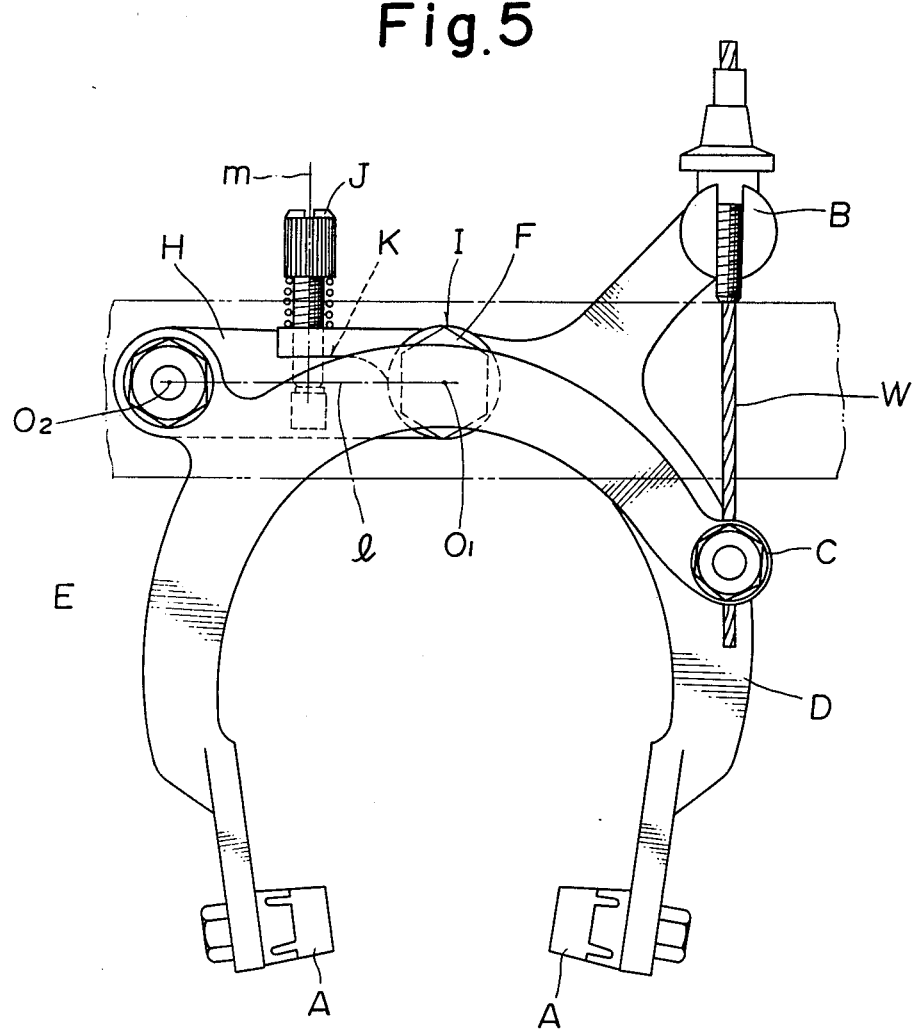
FIG. 5 is a front view of the conventional example of the side-pull type caliper brake.

In the first embodiment, the line $l_2$ connecting the pivot position $0_2$ at the driving side arm 1 and the axis of the pivot shaft 31 is inclined at an angle of 11° with respect to the horizontal line $l_1$. Alternatively, the line $l_2$ may be inclined at an angle of 30° as shown in a second embodiment in FIG. 4. Also, if the rotary-operating portion 43a at the adjusting screw bolt 43 is in a range of not-outwardly projecting from the driving side arm 1, the line $l_2$ may be inclined at an angle of about 45°. The angle $\theta$ of inclination of the line $l_2$ with respect to the horizontal line $l_1$ is not particularly defined, but preferable to be 30° through 40° in consideration of elasticity of the rotary-operating portion 43a at the adjusting screw bolt 43.

In the second embodiment of the invention, the pivot position $0_2$ of driving side arm 1 is provided within a width thereof, whereby the driving side arm 1 is expected to increase in strength. Also, the driving side arm 1, which has no projection, has a good appearance and is simple to machine.

Alternatively, the control wire W may be supported to the operating portion 22 at the driven side arm 2 and the outer sheath 0 may be supported to the operating portion 12 at the driving side arm 1.

Alternatively, the C-like-shaped brake arm 1 may be pivoted to the pivot shaft 31 and the Y-like-shaped brake arm 2 may be pivoted to the support arm 32 so that the brake arm 1 may be at the driven side and that 2 at the driving side.

As the above-mentioned, the adjusting screw bolt 43 is inclined at the rotary-operating portion thereof away from the pivot shaft 31 with respect to the tip of the bolt 43 so that the rotary control portion is disposed slantwise not to contact with the bicycle equipments, such as the bicycle frame, and the reflector, front basket and head lamp, mounted to the frame. Hence, the adjusting screw bolt 43 can easily be operated from slantwise above without being hindered by the bicycle frame and equipments thereon, thereby enabling the adjusting screw bolt 43 to be rotated with ease.

Since the return spring 6 is provided only between the driven side arm 2 and the fixing member 3, not only the strength of return spring 5 is not problematical but also the driven side arm 2 can be associated with operation of the driving side arm 1 even when the return spring 5 is rusted or mudded, thereby reliably preventing the occurrence of the one-sided braking effect. Also, even when the return spring 5 is broken, the brake shoe at the driven side arm 2 is prevented from being brought into press-contact with the wheel rim to cause the braking effect.

Furthermore, the center indicator 8 at the fixing member 3 coincides with the reference portion 7 at the bicycle frame side, whereby the caliper brake can always be mounted at the optimum position so that the intervals between the wheel rim and the respective brake shoes can be equal to each other and equalized the outputs of both the brake shoes, resulting in that the one-sided braking effect is avoided.

Although several embodiments have been described, they are merely exemplary of the invention and not to be constructed as limiting, the invention being defined solely by the appended claims.

What is claimed is:

1. A side-pull type caliper brake provided with a pair of brake arms having brake shoes and operating portions respectively, a fixing member having a pivot shaft and a support arm disposed at one radial side of said pivot shaft and extending reversely to the position where said operating portion at each of said brake arms is disposed, and a return spring, so that one of said brake arms is pivoted to said pivot shaft, the other of said brake arms is supported to said support arm, between said brake arms is provided an association mechanism having an adjusting screw bolt having a rotary operating portion, the pivot position of said brake arm pivoted to said support arm is displaced toward said brake shoe with respect to a horizontal line passing the axis of said pivot shaft, a straight line connecting said pivot position and the axis of said pivot shaft inclines with respect to said horizontal line, said adjusting screw bolt is disposed perpendicularly to said inclining straight line, and said rotary operating portion of said adjusting screw bolt is positioned apart from said pivot shaft with respect to the utmost end of said adjusting screw bolt.

2. A side-pull type caliper brake according to claim 1, wherein said straight line connecting said pivot position of said brake arm pivoted to said support arm and the axis of said pivot shaft inclines at an angle of 30° to 45° with respect to the horizontal line passing the axis of said pivot shaft.

3. A side-pull type caliper brake according to claim 1, wherein said return spring is interposed only between said fixing member and a brake arm at the driven side among said brake arms when said operating portion is operated, said return spring being adapted to bias said driven side brake arm in the direction of following said brake arm to be at the driving side.

4. A side-pull type caliper brake according to claim 1, wherein said fixing member is provided with a center indicator for indicating the center of an interval between said brake shoes.

5. A side-pull type caliper brake according to claim 4, wherein said pivot shaft is provided with abutting members against the bicycle frame and for fixing said pivot shaft, said abutting member being provided with a reference portion for indicating the widthwise center of the bicycle.

* * * * *